United States Patent [19]

Gram

[11] Patent Number: 5,650,087

[45] Date of Patent: Jul. 22, 1997

[54] METAL MOULD FOR MAKING A FROZEN CONFECTIONARY PRODUCT AND A METHOD FOR MAKING THE MOULD

[75] Inventor: Klaus Gram, Vojens, Denmark

[73] Assignee: Gram A/S, Vojens, Denmark

[21] Appl. No.: 411,810

[22] PCT Filed: Mar. 2, 1994

[86] PCT No.: PCT/DK94/00087

§ 371 Date: Apr. 10, 1995

§ 102(e) Date: Apr. 10, 1995

[87] PCT Pub. No.: WO94/19962

PCT Pub. Date: Sep. 15, 1994

[30] Foreign Application Priority Data

Mar. 2, 1993 [DK] Denmark ................... 0235/93

[51] Int. Cl.⁶ .............. B21D 22/00; B29C 33/38
[52] U.S. Cl. ............... 249/134; 72/347; 72/349; 228/173.6; 426/515
[58] Field of Search ............ 249/135; 228/153, 228/173.6; 72/342, 349, 379.2, 379.4; 29/DIG. 45; 426/515, 524

[56] References Cited

U.S. PATENT DOCUMENTS

| 1,615,471 | 1/1927 | Midgley ................. 228/153 |
| 3,722,068 | 3/1973 | Manchester et al. ........ 29/DIG. 45 |
| 3,774,430 | 11/1973 | Greer et al. ............ 72/60 |
| 3,795,970 | 3/1974 | Keathley et al. ......... 148/519 |
| 3,879,009 | 4/1975 | Mao ................... 249/135 |
| 3,923,673 | 12/1975 | Van Henten et al. ...... 72/42 |
| 3,979,815 | 9/1976 | Nakanose et al. ........ 29/DIG. 45 |
| 4,263,375 | 4/1981 | Elrod ................. 228/173.6 |
| 4,805,291 | 2/1989 | Hahn et al. ........... 72/379.2 |
| 5,113,681 | 5/1992 | Guesnon et al. ........ 72/53 |
| 5,322,206 | 6/1994 | Harada et al. ......... 228/173.6 |

FOREIGN PATENT DOCUMENTS

| 62150 | 10/1982 | European Pat. Off. . |
| 0337536 | 10/1989 | European Pat. Off. . |
| 53-114872 | 10/1978 | Japan .............. 73/379.2 |
| 53-47490 | 12/1978 | Japan .............. 249/135 |
| 62-208919 | 9/1987 | Japan .............. 249/135 |
| 64-44256 | 2/1989 | Japan .............. 249/135 |
| 1810183 | 4/1993 | Russian Federation ..... 72/379.2 |
| 225710 | 12/1924 | United Kingdom ...... 72/349 |
| 884724 | 12/1961 | United Kingdom ...... 426/515 |
| 1543696 | 4/1979 | United Kingdom . |
| 2019286 | 10/1979 | United Kingdom . |

OTHER PUBLICATIONS

"Mastery of the Metallurgy and Fabrication of Titanium", Journal of Metals, pp. 322–323 Apr. 1964.

*Primary Examiner*—Robert Davis
*Attorney, Agent, or Firm*—Watson Cole Stevens Davis, P.L.L.C.

[57] ABSTRACT

A metal mould for making a frozen confectionery product is made of a titanium-containing materials, the mould being produced by cold-working a sheet-formed blank, either by deep-drawing or by pressing two half shells which are subsequently welded together. By using titanium for the ice lolly moulds, it is possible to avoid the use of poisonous inhibitors, without any risk of corrosion on the moulds. There is a considerable risk of corrosion on the moulds as the moulds used in the production of frozen confectionery products are subjected to freezing baths with strong saline solutions. When using titanium material for making the metal moulds, it is further possible to perform stress-relieving annealing at a lower temperature than was formerly possible when the moulds were made of stainless steel.

15 Claims, 1 Drawing Sheet

METAL MOULD FOR MAKING A FROZEN CONFECTIONARY PRODUCT AND A METHOD FOR MAKING THE MOULD

BACKGROUND OF THE INVENTION

The present invention relates to a metal mould for use in the production of a frozen confectionary product, preferably ice lollies.

It is generally known that frozen confectionary products are produced in metal moulds, so-called freezing pockets. Such metal moulds were originally made from copper alloys, but for very many years they have been made from stainless steel.

When making the frozen confectionary product, a large number of moulds are led through a freezing bath for freezing the confectionary product and afterwards through a defrosting bath for freeing the frozen product from the mould walls. A large number of moulds are firmly mounted in plates, which form sections in the installation. An installation in which the moulds are placed may be constructed as a rotating installation with the freezing bath and the defrosting bath arranged in circular segments. The installation may alternatively be constructed as an installation in which the moulds are led through freezing and defrosting baths which are arranged on a line. When passing through the baths, the moulds are exposed to a temperature difference from down to approx. −55° C. to a temperature of up to about 30° C.

The freezing bath normally comprises a calcium chloride solution ($CaCl_2$ saline solution). In these saline solutions there will be a considerable risk of corrosion on the moulds. If just one mould in a section has a corrosion hole, it will be necessary to replace the whole section. This involves substantial expenses.

Therefore, in order to reduce the corrosion, inhibitors have been used in the freezing bath. A generally used inhibitor has been sodium bichromate ($Na_2Cr$). This inhibitor will form a protection layer on all surfaces which contact the saline solution. The inhibitors are difficult to work with as they irritate the skin. Besides there is a health risk if the inhibitor or the saline solution is allowed to penetrate into the confectionary product through corrosion holes.

In certain cases, owing to requirements from the authorities or internal requirements, it is impossible to use inhibitors because of the health risk involved in using these poisonous substances. In such cases premixed saline solutions are used in the freezing bath instead. Due to the absence of the inhibitor, however, it will be necessary to maintain pH within very narrow limits of between approx. 8.5 and 9.0 in order to avoid serious corrosion on the moulds and the other parts of the installation with which the saline solution comes in contact. Even very short periods with pH beyond the above-mentioned limits may give rise to serious corrosion which necessitate replacement of one or several sections. Thus it is necessary to perform a constant supervision and add pH-adjusting agents if no inhibitors are used.

It has been commonly known in the defrosting bath to protect the moulds against corrosion by using a corrosion plug, e.g., of anodized zinc. It has been necessary to inspect this corrosion plug frequently and make replacements in order to avoid corrosion of the moulds.

A further risk of mould corrosion may be caused by current failures in a plant. Thus, it has been essential that the moulds and other parts of an installation were grounded correctly. Such correct grounding may in certain cases be difficult.

Thus, the attempts that have been made until now to avoid corrosion of metal moulds have only been directed towards adaptation/modification of the involved fluids, inhibitors, etc., in the freezing bath and the defrosting bath.

Although metals which are very resistant to corrosion have been known for years, these have not been used so far because of difficulties related to manufacturing, which involves difficult shaping and welding. Thus, until now it has not been considered a realistic and practical option to use other metals which will give the metal moulds a longer life under subjection to the above-mentioned fluids.

It is the object of the present invention to remedy the drawbacks of known metal moulds by disclosing a new metal mould and a method for making such mould.

SUMMARY OF THE INVENTION

According to the present invention, the metal moulds are made of titanium.

The mechanical characteristics and methods of working titanium materials have been known for many years and are described thoroughly in a great deal of literature. Among other things, it appears from this literature that titanium materials are difficult to pressform and practically impossible to deep-draw. As moulds have been manufactured either by press forming or by deep-drawing until now, titanium has consequently not previously been used.

Titanium has a high affinity to oxygen and a protecting layer of titanium dioxide will form rapidly, providing effective protection against corrosion of the underlying metal. Thus, the titanium moulds, i.e., which have titanium at an outer surface thereof, will be resistant to the fluids used in freezing baths and defrosting baths in production installations. When using titanium moulds, it is possible in an advantageous manner to avoid the use of the noxious/poisonous inhibitors, and the life of titanium moulds will consequently be considerably longer than that of traditional moulds of stainless steel even though no inhibitors are used. Furthermore, there will not be as strict requirements as to maintaining the pH value.

In the method according to the invention for making a metal mould of titanium, the mould is made by cold-working a sheet-formed blank.

The cold-working may either be performed by pressing two half shells which are welded together, or by deep-drawing performed in several steps.

Such cold-workings are also used in conventional manufacturing of moulds of stainless steel. After the cold-working of a sheet-formed blank, stress-relieving annealing must be performed. For stress-relieving annealing stainless steel it has been necessary to use high temperatures of approx. 1040° C. The stress-relieving annealing must be performed at these high temperatures due to the fact that during the cold-working some austenitious steel is transformed into ferritious steel, which results in a shorter life owing to less resistance to corrosion. Thus it is necessary to perform a stress-relieving heating/annealing in order to transform the ferritious steel into austenitious steel in order to obtain sufficient resistance to corrosion in the moulds. Stress-relieving annealing must be used both in press forming and deep-drawing of moulds made of stainless steel.

It is well known that titanium has a high affinity to other metals and, therefore, has a tendency to stick to a pressing tool during forming. However, surprisingly it has turned out to be possible, by an adequate pressure speed and effective lubricating, not just to press half shells but also to perform a deep-drawing. It has proven possible to use pressure speeds corresponding to the pressure speeds for steel, subject to an adequate lubricating of tools. The deep-drawing may be performed in several steps in order to obtain a total drawing ratio D:d of 6 to 10, at a drawing ratio of up to 2.5–2.6 in each step that is necessary for moulds for the production of frozen confectionary products.

The cold-working performed also requires stress-relieving annealing. However, for titanium this may be performed at a considerably lower temperature and thus at considerably lower costs. Thus, it is possible to perform the stress-relieving annealing of titanium at temperatures of between 650° C. and 700° C. or even as low as temperatures of between 450° C. and 550° C. At these temperatures the duration may last between 20 minutes and 1 hour, preferably between 30 and 40 minutes. In this manner a stress-relieving annealing is achieved which allows further deep-drawing, which is preferably performed in 5–8 steps.

In stress-relieving annealing titanium there is no risk of formations of internal structures which reduce the resistance to corrosion such as is the case for stainless steel.

A large number of different types of commercially available titanium materials may be used in the manufacture of moulds according to the invention. Examples of titanium materials that may be mentioned are various types of commercially available pure titanium marketed by IMI Titanium Limited, IMI 110, 115, 125, 130, 155, and 150. Other examples of titanium alloys from the same manufacturer are IMI 260 and 263, which have an improved resistance to corrosion. Other usable titanium alloys are IMI 230, 318, 367, 550, 551,685, 829, and 834. It is also possible to use titanium material sold by AVESTA Stainless Inc. An example of their titanium materials is ATi24, which is particularly suitable for deep-drawing. Alternatively, one may use ATi30, ATi35, and ATi24PD, the latter of which is particularly resistant to corrosion. Another example of a commercially available titanium material is ASTM-B 265 grade 1.

For lubricating one may use any lubricants known in the art for use in deep-drawing, e.g., lubricants having a viscosity of between 4 and 5 cSt.

It is possible to use deep-drawing press tools with different profiles. Thus, one may use round-headed tools, flat-headed tools, tolls with a circular cross-section, a square cross-section or other types of cross-sections known for confectionary moulds.

The thickness of the initial sheet-formed blank item varies depending on the individual mould. However, it will be possible to use a sheet having an initial thickness of between 0.6 and 1 mm, preferably 0.8 mm, for the manufacturing of prevailing confectionary moulds.

DESCRIPTION OF THE DRAWINGS

The invention will now be described with reference to an example which is given in combination with FIGS. 1–7 which depict a deep-drawing in six steps.

A round blank 1 is shown in FIG. 1 and is manufactured from ASTM-B 265 grade 1 titanium. A lubricant with a viscosity of 4.5 cSt. is used for the drawing in each step, and after each drawing a stress-relieving annealing is performed at 650° C. with a heating time of 30 minutes.

Figure 1:
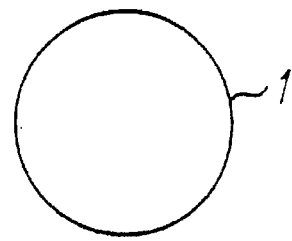
Figure 2:
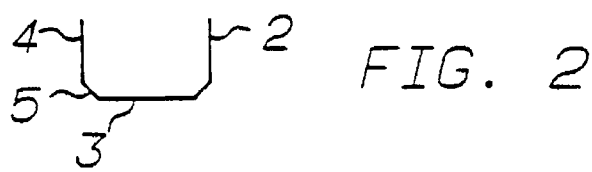

In the first drawing, which is illustrated in FIG. 2, a drawing ratio of 2.5 is used to form a cup-shaped blank 2 having a bottom 3 and a substantially cylindrical wall 4, which are connected by an edge area 5.

Figure 3:
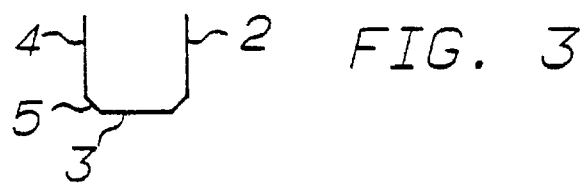

In step two, which is illustrated in FIG. 3, a drawing ratio of 1.5 is used, and the height of the substantially cylindrical wall 4 is increased.

Figure 4:
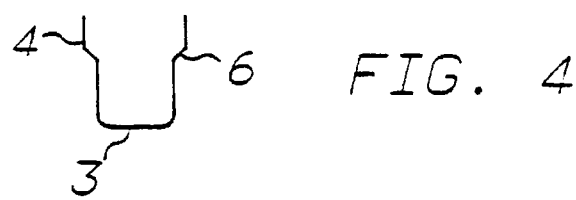

In step three, which is illustrated in FIG. 4, a drawing ratio of 1.5 is used again to form a first recess 6 in the cylindrical wall 4.

Figure 5:
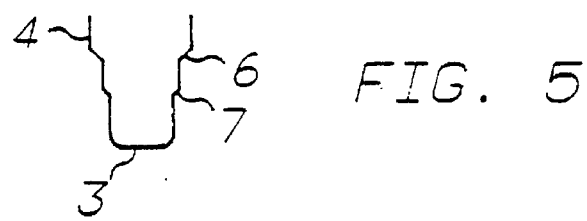

In step four, which is illustrated in FIG. 5, a drawing ratio of 1.5 is used to form another recess 7 in the cylindrical wall 4.

Figure 6:
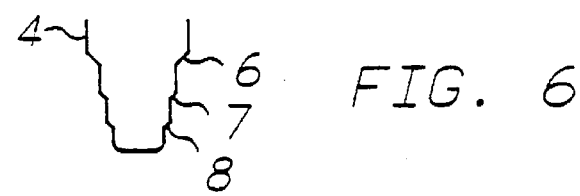

In step five, which is illustrated in FIG. 6, a drawing relationship of 1.3 is used to form a third recess 8 in the cylindrical wall 4. After the fifth drawing, the confectionary mould is completed in its final design 9. A drawing ratio cannot be said to exist in this step because what is performed is actually a smoothing of the formed recesses 6, 7 and 8. After completion of the confectionary mould 9, which is illustrated in FIG. 7, a final stress-relieving annealing is performed, which is also performed at 650° C. and a heating time of 30 minutes.

Figure 7:
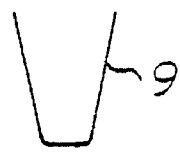

For the sake of good order it is noted that the drawing only illustrates one single example and that the invention may be realized using many other types of titanium materials and for the manufacture of confectionary moulds having other designs than that of the finished confectionary mould 9 shown in FIG. 7

I claim:

1. A metal mould for use in the production of a frozen confectionery product, said metal mould comprising a hollow mould element which defines an inner surface facing a hollow interior of said mould element and an exterior surface, said mould element consisting of a titanium-containing material at its exterior surface for resistance to corrosion by chemicals in a freezing bath through which said mould element is passed.

2. A mould according to claim 1 which has been manufactured in one piece by deep-drawing.

3. A mould according to claim 1, which has been manufactured from two pressformed half shells which have been welded together.

4. A mould according to claim 1, which has been stress-relief annealed at a maximum temperature of 650°–700° C.

5. A method for making a metal mould, said metal mould comprising a hollow mould element which defines an inner surface facing a hollow interior of said mould element and an exterior surface, said mould element consisting of a titanium-containing material at its exterior surface for resistance to corrosion by chemicals in a freezing bath through which said mould element is passed, said method comprising providing a sheet-formed blank which has titanium-containing material at one principal surface thereof and cold working said blank to form said metal mould.

6. A method according to claim 5, wherein the cold-working consists in deep-drawing in 5 to 8 steps, and that the blank is stress-relief annealed after each drawing.

7. A method according to claim 5, wherein the cold-working consists in a press forming of two half shells, said two half shells are welded together to form the finished mould, and the mould is stress-relief annealed.

8. A method according to claim 6, wherein the stress-relief annealing is performed at a maximum temperature of 650°–700° C. for a period of between 20 minutes and 1 hour.

9. A method of making a frozen confectionery product which comprises the steps of providing a hollow mould having an outer surface made of a titanium-containing material, delivering a confectionery product into said mould, and passing said mould with confectionery product through baths containing a freezing agent and a defrosting agent to provide said frozen confectionery product in said mould, said titanium-containing material resisting corrosion.

10. A method according to claim 9, wherein said titanium-containing material is a titanium alloy.

11. A method according to claim 9, wherein said titanium-containing material is pure titanium.

12. A metal mould according to claim 1, wherein said titanium-containing material is a titanium alloy.

13. A metal mould according to claim 1, wherein said titanium-containing material is pure titanium.

14. A mould according to claim 4, which has been stress-relief annealed at a maximum temperature of 450° to 550° C.

15. A method according to claim 8, wherein said stress-relief annealing is performed at a maximum of 450° to 550° C. for between 30 and 40 minutes.

* * * * *